United States Patent
Bekers et al.

(10) Patent No.: US 6,935,200 B2
(45) Date of Patent: Aug. 30, 2005

(54) MICROMOVEMENT MEASURING DEVICE AND METHOD OF MOVEMENT PROCESS CONVERSION TO AN ELECTRIC SIGNAL

(75) Inventors: Leonids Bekers, Riga (LV); Bonifatijs Lubgins, Riga (LV); Jehezkelis Finkelshteins, Riga (LV); Juris Nurovs, Moscow (RU); Alexandra Piorunskis, Moscow (RU)

(73) Assignee: Anglo-Baltic Holding Lim. Company, Channel Islands (GB)

( * ) Notice: Subject to any disclaimer, the term of this patent is extended or adjusted under 35 U.S.C. 154(b) by 0 days.

(21) Appl. No.: 10/474,788
(22) PCT Filed: May 3, 2001
(86) PCT No.: PCT/LV01/00002
§ 371 (c)(1), (2), (4) Date: Mar. 1, 2004
(87) PCT Pub. No.: WO02/42800
PCT Pub. Date: May 30, 2002

(65) Prior Publication Data
US 2004/0129094 A1 Jul. 8, 2004

(30) Foreign Application Priority Data
Nov. 24, 2000 (LV) .............................................. P-00-159

(51) Int. Cl.$^7$ .............................................. G01M 19/00
(52) U.S. Cl. ..................................................... 73/865.8
(58) Field of Search .............................. 73/865.8, 866.1; 377/17, 18, 24; 33/700, 701, 788, 712; 324/207.11

(56) References Cited

FOREIGN PATENT DOCUMENTS

| DE | 3824950 A1 | 1/1990 |
|---|---|---|
| SU | 947626 | 7/1982 |

OTHER PUBLICATIONS

International Search Report for PCT/LV01/00002, dated Aug. 6, 2001.
International Preliminary Examination Report for PCT/LV01/00002, dated Feb. 25, 2002.

*Primary Examiner*—Robert Raevis
(74) *Attorney, Agent, or Firm*—Abelman, Frayne, Schwab

(57) ABSTRACT

A micromovement measuring device records creeping and dynamic infraprocesses both of natural and artificial origin, including seismic processes or infrasound and gravitational waves. The device has a sensitivity for measuring in a wide dynamic range. The device includes a measuring element, a sensitive element, a membrane, a signal conditioner, a fixing electromagnet, and a pulling electromagnet. The pulling electromagnet is located on the membrane which increases the range of the measurable movements. A hermetic housing prevents the formation of oxides or similar films at the working surfaces of the measuring and sensitive elements. A method of converting movement to electric signals is performed by the device, which takes an electronic field emission current to be a characteristic of quantization, and so movements in the range of Angstroms may be recorded.

14 Claims, 1 Drawing Sheet

MICROMOVEMENT MEASURING DEVICE AND METHOD OF MOVEMENT PROCESS CONVERSION TO AN ELECTRIC SIGNAL

BACKGROUND OF THE INVENTION

1. Field of the Invention

The invention relates to the field of instrumentation, in particular, to measurement of micromovement, and may be used for measuring, detecting, and recording creeping and dynamic infraprocesses in nature, engineering, and bionics; for example, for recording baric, thermal, and hygrometric tendencies in meteorology; for recording creeping of engineering structures; for testing leakproofness of small and large installations and in security systems; as well as for recording seismic, infrasound, and gravitation waves. In bionics, the proposed device may be used as a part of tactile sensitivity, in bionic prostheses, bionic robots, and zoo-robots.

2. Description of the Related Art

To address the above problems, measuring systems should have maximum possible sensitivity up to Angstrom units (Å)-wide dynamic ranges and low sluggishness.

At present, the highest sensitivity and widest dynamic ranges are provided by X-ray interferometers which implement spectrometric methods of measuring. However, in the cases which lie outside metrology and investigations of crystal structure of materials, the use of X-ray interferometers does not find application owing to high sluggishness of the sensitive elements employed, cumbersome apparatus design, complexity, and high price.

Capacitive and inductive transducers have found wide application for measuring small movements. The limitation of their use is attributed to the fact that raising the sensitivity of these transducers necessarily leads to narrowing of the dynamic range because of non-linearity of their analog measuring characteristics. The section of a particular portion of the characteristics determines the dynamic range of the transducer.

Devices are known for measuring small movements that are based on artificial quantization of linear or angular movements by means of the distributed quantizing measuring elements or grids. As an example, an incremental encoder may be used. Resolution of such types of encoders depends on the number of sensitive segments on the disk or band of the transducer, which determines a mechanical limit of their sensitivity, such as no more than 0.01 microns.

The closest known device to the present invention is a micromovement sensor according to the U.S.S.R. Patent Number 947,626, in which a method of measuring using natural quantization effects is described. The micromovement sensing device contains a transducer consisting of sensitive and measuring elements which convert the monotonic movements to a pulse-delta-modulated electric signal. A sensitive element is fixed on an elastic membrane and interacts with a source of the micromovement, such as the tested object, while a spring-loaded mobile measuring element is a core of the electromagnet which fixes the measuring element in the position of contact with the sensitive element, when applying exciting current from a signal conditioner.

In the initial state, the electric contact between sensitive and measuring elements creates a closed electric circuit through which electric current flows. As a result, an exciting current appears at the output of the signal conditioner which energizes the electromagnet and fixes the measuring element. When the tested object shifts, the sensitive element moves in the direction of breaking the contact between the measuring and sensitive elements due to the action of a measuring force created by the membrane. At the instant of the breaking of the electric circuit, the signal conditioner removes the exciting current from the winding of the fixing electromagnet, and the measuring element, under the action of a spring, moves in the direction toward the sensitive element until contact between the sensitive and measuring elements is recovered and the measuring element is fixed in a new position.

The breaking and recovering of the contact forms the leading and trailing edges of the pulse signal which is equivalent to a single movement of the measuring element, thus performing conversion of monotonic movement to a pulse-delta-modulated electric signal by the use of a natural quantization effect of hysteresis. The quantized movement is characterized by the value determined by two states of the electric contact; that is, closed or broken.

The disadvantage of the known device is determined by the fact that, at the instant in which contact between the measuring and sensitive elements is set up, the force of the spring pressure moving the measuring elements is transmitted through the sensitive element onto the tested object, in which elastic microdeformation arises as a result of this contact force. The value of this microdeformation restricts the ultimate attainable sensitivity of the known device to the level of 0.2 microns. In addition, when electric contact is broken, an electroerosive bridge arises, causing a bridge current to be detected by the signal conditioner as the presence of the contact, and the measuring pulse arises only after bridge breaking. Thus, the length of every micromovement of the measuring element cannot be less than the length of the electroerosive bridge and the value of arisen microdeformation taken together. Additionally, occurrence of the electroerosive bridge leads to a geometry violation of the contact elements which causes instability of their meteorological characteristics.

BRIEF SUMMARY OF THE INVENTION

The object of the proposed invention is to raise the sensitivity of a measuring device in a wide dynamic range by eliminating elastic microdeformations in a dimensional circuit transducer object, and also to eliminate the electroerosive processes at working surfaces of the sensitive and measuring elements.

The object is achieved in the following way: the device for measuring micromovements includes measuring and sensitive elements, a membrane, and a signal conditioner, a first output of which is connected to the winding of a fixing electromagnet which is additionally provided with the measuring element. The winding of a pulling electromagnet is connected to a second output of the signal conditioner which is inverse to the output connected to the winding of the fixing electromagnet.

Maximum dynamic range of micromovements to be measured may be provided by locating the pulling electromagnet on the membrane connected to the sensitive element.

To exclude the formation of oxides, water, and other similar films at the working surfaces of the sensitive and measuring elements, the present device is located in a hermetic housing filled with an inert medium.

The method of converting micromovements to an electrical signal which is used in the present device excludes the formation of the electroerosive bridges in running clearance.

This method lies in the fact that fixation of the measuring element is provided when the current of the field electronic emission arises between the measuring and sensitive elements, and the measuring element is released and shifted when the current of the field electronic emission is interrupted.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
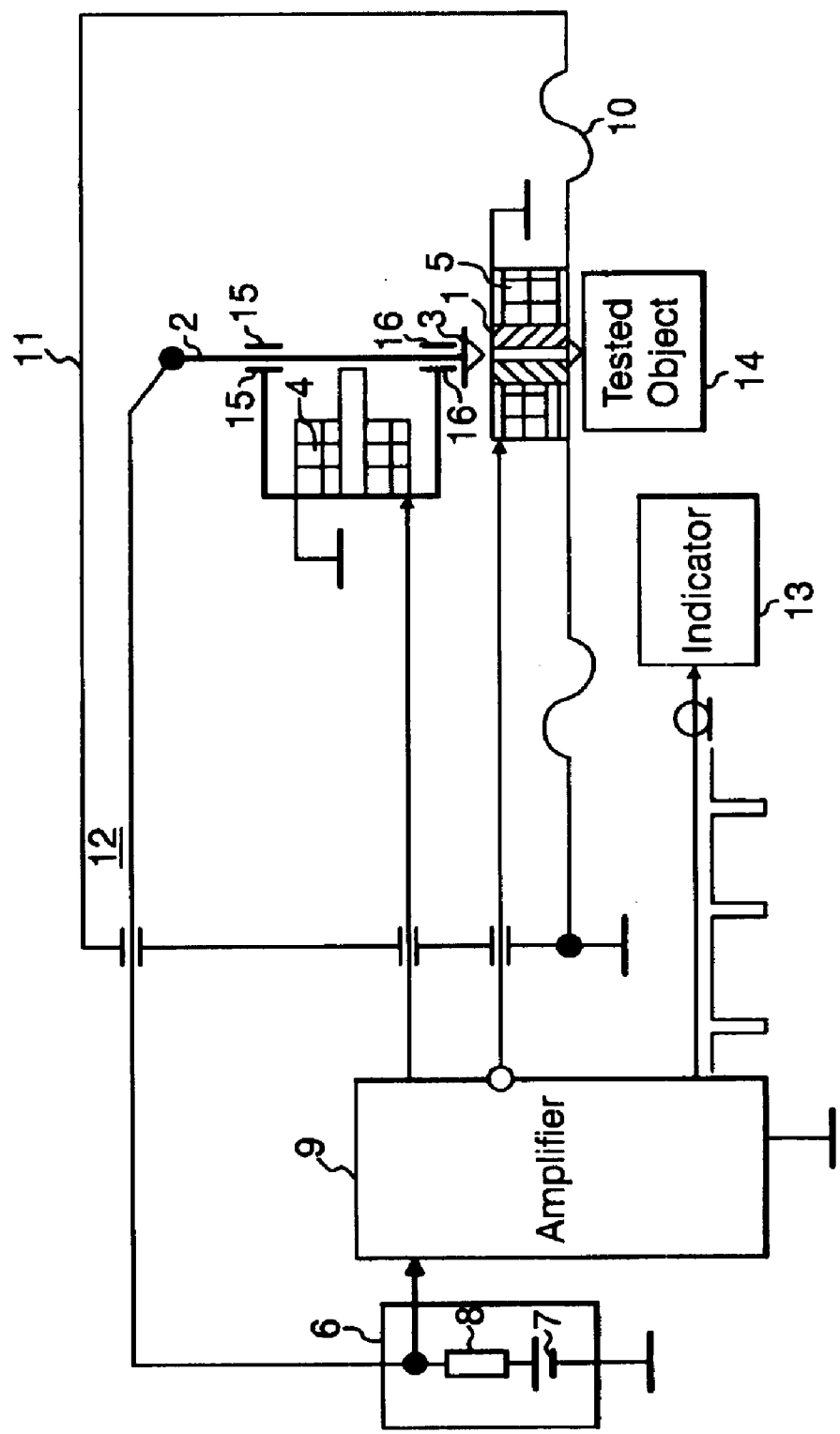
FIG. 1 is a schematic illustrating the micromovement measuring device of the present invention.

The principal diagram of the device is given in FIG. 1.

The micromovement measuring device consists of a sensitive element 1, a measuring element 2 with a washer 3, and a fixing electromagnet 4. The measuring element 2 is capable of longitudinal movement between guides 15, 16 due to movement of the washer 3 away from or toward the sensitive element 1 in response to attractive magnetic forces applied to the washer 3 from either of the fixing electromagnet 4 or from the pulling electromagnet 5, respectively. The measuring element 2 is electrically connected to a signal conditioner 6 which includes an operating voltage source 7 and a current limiter 8, such that a voltage from the voltage source 7 is applied to the measuring element 2. Accordingly, the voltage differential across a gap between the measuring element 2 and the sensitive element 1 creates a field electronic emission current therebetween. A first output of the signal conditioner 6 is connected to the input of an amplifier 9, the direct output of which is connected to the winding of the fixing electromagnet 4, and an inverse output of which is connected to the winding of a pulling electromagnet 5. The pulling electromagnet 5 is located on a membrane 10, which together with a housing 11 forms a hermetic chamber 12 filled with protective inert medium. The output pulse signal comes from the amplifier 9 to an indicator 13. The conditional tested object 14 is connected to the sensitive element 1.

The device operates in the following way. When the sensitive element 1 moves under the action of an elastic force of the membrane 10 followed by the tested object 14, an interruption of the field electronic emission current between the sensitive element 1 and the measuring element 2 occurs in the measuring curcuit formed by the operating voltage source 7, the current limiter 8, the measuring element 2, the sensitive element 1, the membrane 10, and the ground. At the instant of interruption of the field electronic emission current, the amplifier 9 controlled by the signal conditioner 6 discontinues an exciting current from the fixing electromagnet 4, and simultaneously applies an exciting current onto the winding of the pulling electromagnet 5. Under the action of attractive force from the pulling electromagnet 5 which is applied to the washer 3, the measuring element 2 is freed from fixing force of the fixing electromagnet 4 to move in the direction to the sensitive element 1. This movement occurs until the electronic field emission current arises between the sensitive element 1 and the measuring element 2 in the above measuring curcuit; that is, at the distance that is determined by the expression $$\lambda = U/E,$$

where $\lambda$ is the value of the clearance between the measuring of the element 2 and sensitive element 1 at which the electronic field emission current arises; U is the chosen value of the operating voltage; and E is the intensity of electronic field emission equal toabout $10^9$ Volt/meter.

At a chosen value of the operating voltage 0.05 Volt, the distance at which the current electronic field emission will occur is equal to about $5\times10^{-11}$ m., or 0.5 Å.

At the instant when the emission current arises, the electromagnets 4-5 controlled by the amplifier 9 change their state: the exciting current is discontinued from being applied to the pulling electromagnet 5, and the measuring element 2 is fixed in a new position because of its attraction to the fixing electromagnet 4. The proceeding movement of the sensitive element 1 under elastic force of the membrane 10 followed by the moving tested object 14 leads to the interruption of the electronic field emission current at the distance between the measuring element 2 and the sensitive element 1 equal to $\lambda+\Delta$, where $\Delta$ is a value of hysteresis of electronic field emission, and the process is repeated in the above-described sequence.

Every cycle recurring at the movement of the sensitive element 1 forms both leading and training edges of pulses which are equivalent to a single movement of the measuring element 2. The occurring pulses come from the amplifier 9 to the indicator 13 and are recorded.

The value of one pulse is determined by the combined hysteresis, which is dependent on the sluggishness of the measuring element 2, on the reaction time of the pulling electromagnet 5 and the fixing electromagnet 4, and on the value of hysteresis of electronic field emission as well.

The location of the pulling electromagnet 5 on the membrane 10 provides functioning of the device along all movement lengths of the measuring element 2, which is determined by allowed deflection of the membrane 10. It is explained by the fact that, while moving, a magnetic running clearance of the sensitive element 1 is kept constant in this case.

The location of the measuring element 2 and the sensitive element 1 in the hermetic chamber 12, established by the housing 11 and the membrane 10 and filled with an inert medium, excludes the formation, at the working surfaces of the elements 1–2, of oxides and other films which would otherwise prevent occurrence of electronic field emission current.

The proposed invention has the following features:

a) conversion of the monotonic micromovements to pulse-delta-modulated electric signals, which occurs without generation of microdeformations in the dimensional circuit transducer of the tested object, since, as is evident from the foregoing, it is provided in the following way: the transfer of the measuring circuit from one stable state into another occurs in the absence of the direct electric contact between the measuring element 2 and the sensitive element 1 and, therefore, without causing elastic deformation; and b) the sensitivity of the measuring circuit is set by the chosen value of an operating voltage.

The whole complex of the features of the present invention and the method provides conversion of micromovements to pulse-delta-modulated electrical signals with a device sensitivity in a range of units of Angstroms.

An example of an embodiment of the measurement of the movement of the metallic bar was made in accordance with the present invention determined by the GOST 8.491-83 specification, in which GOST is the All-Union State Standard of the former U.S.S.R. This permitted the exclusion of some disturbances connected with non-uniform movement in the case of using of a screw pair, according to the procedure of GOST. The measuring spring head or opticator of a known type was used as a reference apparatus.

When extending a bar by one micron to be recorded by the opticator, the signal conditioner of the present invention, using a transducer, generated a sequence of $2\times10^4$ pulses recorded by a known frequency meter, such as when using gold surfaces of the measuring and sensitive elements and when the value of operating voltage in measuring circuit is equal to 0.5 Volt. It means that one pulse corresponds to $0.5\times10^{-10}$ meter, that is, about 0.5Å, with the value defining the sensitivity of the present invention.

The proposed device may be embodied in a two-channel version, if the need arises, to measure sign-variable movements.

What is claimed is:

1. The micromovement measuring device for measuring movement of a test object, the micromovement measuring device comprising:

a signal conditioner having a first output;

an amplifier connected to the first output of the signal conditioner for generating a direct output and an inverse output therefrom;

a sensitive element;

a measuring element for receiving a voltage from the signal conditioner to create a field electronic emission current across a gap between the measuring element and the sensitive element;

a membrane substantially adjacent to the test object, with the membrane being connected to the sensitive element, wherein movement of the membrane caused by movement of the test object is transferred to movement of the sensitive element;

a fixing electromagnet, the winding of which is connected to the direct output of the amplifier; and a pulling electromagnet interacting with the sensitive element, wherein the winding of the pulling electromagnet is connected to the inverse output of the amplifier;

wherein the signal conditioner controls the pulling electromagnet and the fixing electromagnet when the movement of the test object affects the field electronic emission current, and generates measurement signals for measuring the movement of the test object.

2. The micromovement measuring device of claim 1, wherein the pulling electromagnet is attached to the membrane connected to the sensitive element.

3. The micromovement measuring device of claim 1, wherein the measuring element and the sensitive element are located in an hermetic housing having a plurality of housing walls filled with an inert medium, and one of the housing walls is formed by the membrane connected to the sensitive element.

4. A micromovement measuring device comprising:

a signal conditioner having first and second outputs;

a measuring element;

a sensitive element;

a fixing electromagnet, the winding of which is connected to the first output of the signal conditioner; and a pulling electromagnet for pulling the measuring element toward the sensitive element, wherein the winding of the pulling electromagnet is connected to the second output of the signal conditioner, and wherein the signal conditioner is switchable between a first state in which the fixing electromagnet is released and the pulling electromagnet energized, and a second state in which the measuring element is held by the fixing electromagnet while the sensitive element is being moved away from the measuring element.

5. A micromovement measuring device according to claim 4, wherein the pulling electromagnet is located on a membrane connected to the sensitive element.

6. A micromovement measuring device according to claim 5, wherein the sensitive element and the measuring element have a gap therebetween, the gap being located in an hermetic housing having a plurality of housing walls filled with an inert medium, one of the housing walls being formed by the membrane.

7. A micromovement measuring device comprising:

(a) a sensitive element, the movement of which is to be measured;

(b) a measuring element, movable with respect to the sensitive element and seperated therefrom by a gap, across which a voltage is applied;

(c) a fixing device for controllably fixing the position of the measuring element;

(d) a pulling device for controllably pulling the measuring element toward the sensitive element;

(e) a signal conditioner for controlling the fixing and pulling devices and being switchable between a first state in which the fixing device is released and the pulling device energized, and a second state in which the measuring element is secured by the fixing device;

wherein, in the first state, the measuring device approaches the sensitive element until a field emission current arises across the gap, the signal conditioner then switching to the second state; and wherein, in the second state, the sensitive element is moved away from the measuring element until the field emission current is interrupted, the signal conditioner then switching back to the first state.

8. A micromovement measuring device according to claim 7 wherein the sensitive element is secured to a flexible membrane.

9. A micromovement measuring device according to claim 8 in which the gap defined between the measuring element and the sensitive element is located within an hermetic housing having a plurality of housing walls, one of the housing walls being defined by the membrane.

10. A micromovement measuring device according to claim 8 in which the membrane forms part of an electric circuit which also includes the sensitive element and the measuring element.

11. A micromovement measuring device according to claim 7 wherein the sensitive element and the pulling electromagnet are both secured to a flexible membrane.

12. A micromovement measuring device according to claim 11 in which the gap defined between the measuring element and the sensitive element is located within an hermetic housing having a plurality of housing walls, one of the housing walls being defined by the membrane.

13. A micromovement measuring device according to claim 11 in which the membrane forms part of an electric circuit which also includes the sensitive element and the measuring element.

14. A micromovement measuring device according to claim 7 in which the signal conditioner includes a voltage source, for applying the voltage across the gap, and an amplifier for controlling the fixing and pulling devices.

* * * * *